United States Patent [19]

Yinger

[11] Patent Number: 4,872,283
[45] Date of Patent: Oct. 10, 1989

[54] PLANT SUPPORT

[76] Inventor: William W. Yinger, 4200 Tartan Way, Roswell, Ga. 30075

[21] Appl. No.: 191,540

[22] Filed: May 9, 1988

[51] Int. Cl.⁴ .............................................. A01G 9/12
[52] U.S. Cl. ........................................ 47/70; 47/41.11
[58] Field of Search ................ 47/66, 70, 41.11, 44, 47/45, 47; 248/156, 213.2; 211/182, 175

[56] References Cited

U.S. PATENT DOCUMENTS

| | | | |
|---|---|---|---|
| 500,140 | 6/1893 | Kruger | 47/70 X |
| 548,508 | 10/1895 | Bjelland | 47/47 |
| 1,873,693 | 8/1932 | Whitfield | 47/41.11 X |
| 2,894,358 | 7/1959 | Ward | |

FOREIGN PATENT DOCUMENTS

| | | | |
|---|---|---|---|
| 553082 | 1/1960 | Belgium | 47/47 |
| 173561 | 3/1905 | Fed. Rep. of Germany | 47/47 |
| 2519513 | 7/1983 | France | 47/70 |

Primary Examiner—Danton D. DeMille

[57] ABSTRACT

A support mechanism installable on a plant container to maintain the plant stem (stalk) in a vertical position. Adjustments are built into the mechanism to vary the size and location of a stem support ring structure. The mechanism can be used on a range of container sizes.

4 Claims, 1 Drawing Sheet

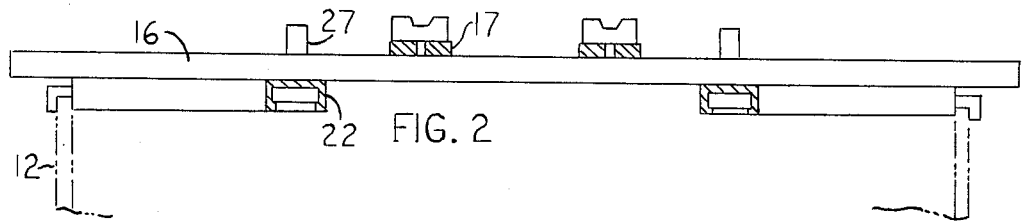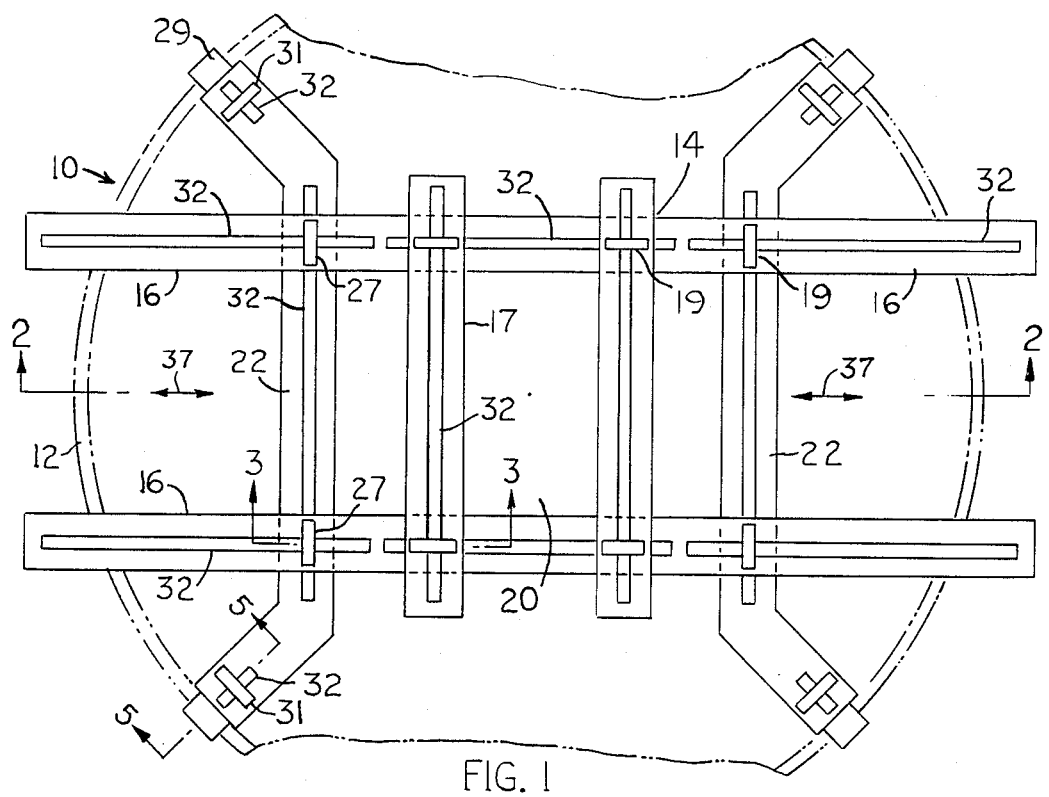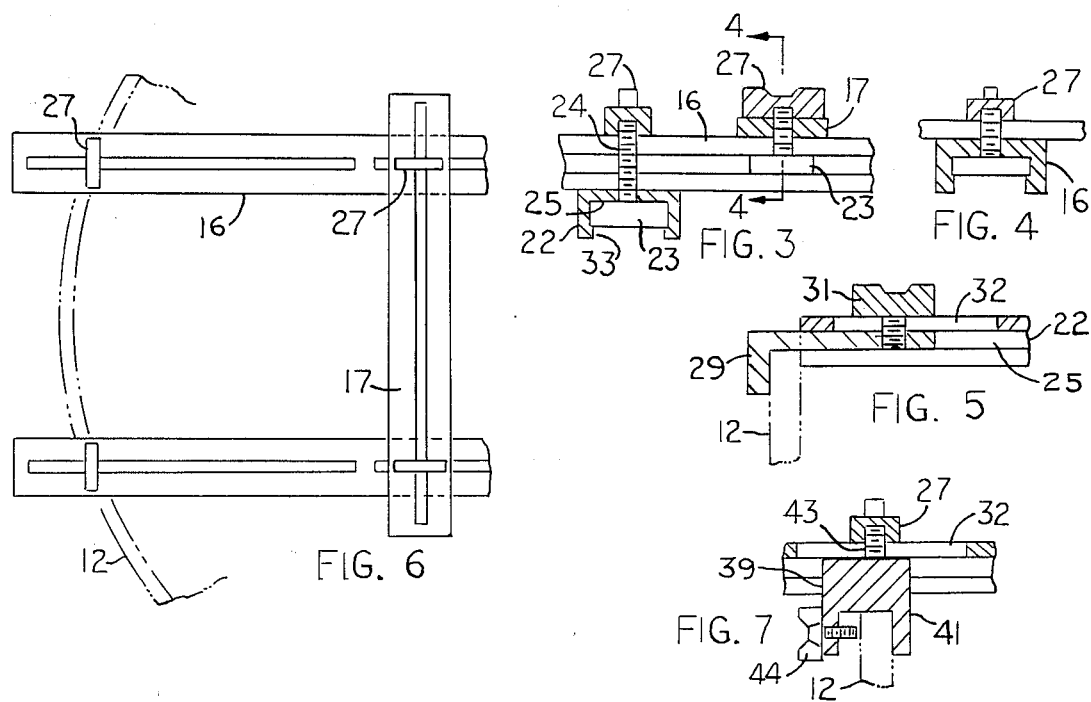

PLANT SUPPORT

BACKGROUND OF THE INVENTION

This invention relates to a framework for supporting the main stem (or stems) of a growing plant in a container. The framework can be clamped to the rim area of a plant container to provide a rigid non-deflectable ring-type support for the plant stem. Adjustments are built into the framework for effectively varying the size of the ring-type support, whereby the framework can be used with plants having different stem diameters or different numbers of stems.

Prior to my invention other plant-support structures have been used. U.S. Pat. No. 3,088,245 to C. Menge shows a circular frame comprised of a lower hoop of small diameter and an upper hoop of a larger diameter. Rod type legs connect the two hoops to form a funnel-like framework designed to encircle a growing plant.

U.S. Pat. No. 2,785,508 to W. Coleman discloses an annular disc-like member having a number of dependent fingers for clamp-type engagement on the rim area of a flower pot. The disc-like member underlies the leafy foliage of a small plant to shield the foliage from contact with the rim area of the pot or the earth in the pot.

U.S. Pat. No. 2,894,358 to A. Ward shows a horizontal frame adapted to rest on the rim area of a flower pot to underlie plant foliage. The frame comprises two laterally movable slats permitting the frame to slip down over the pot for frame removal purposes, thus avoiding possible damage to the plant foliage which could result if the frame were to be pulled upwardly over the plant.

U.S. Pat. No. 3,328,915 to O. Elbert discloses a flat wire rack structure having a number of downwardly-extending legs for locating the rack structure above the earth surface. Plant foliage rests on the rack structure out of contact with the earth surface.

U.S. Pat. No. 4,074,461 to A. Hirschman shows a plant support in the form of one or more upright masts positionable alongside the trunk or main stem of a growing plant. A series of transverse rods extend from the mast(s) through holes in the side wall of the plant container to maintain the mast(s) upright.

SUMMARY OF THE INVENTION

None of the above discussed plant support devices appears to contemplate a plant stem-encirclement ring structure which can be enlarged or reduced in accordance with variations in stem diameter (different types of plants or different sizes of the same type plant).

I am proposing a support mechanism for growing plants wherein a stem-encirclement structure can be enlarged or reduced in size, as necessary to adequately support (reinforce) a variety of different size plant stems. My proposed support structure is designed to clamp onto the rim area of a plant container; the support structure does not rely on the earth within the container for stabilizing purposes. A moist (soft) earth condition can be maintained within the container without danger of destabilizing or upsetting the plant support structure.

A primary object of my invention is to provide a plant support that can be used with single stem plants or multiple stem plants (of varying diameter).

Another object is to provide a plant stem support that is adjustable as to its location on the container, i.e. on the container centerline or in various locations offset from the container centerline.

A further object is to provide a plant stem support structure that is usable on a range of different size plant containers.

A still further object is to provide a plant stem support structure that is installable on a plant container after the plant is in-place. A related object is to provide a stem support structure that can be installed without harming the plant foliage.

Another object is to provide a plant stem support structure that has relatively few loose parts subject to being lost or mislaid.

THE DRAWINGS

FIG. 1 is a top view of a plant stem support structure embodying my invention.

FIG. 2 is a sectional view taken on line 2—2 FIG. 1.

FIG. 3 is an enlarged sectional view taken on line 3—3 in FIG. 1.

FIG. 4 is a fragmentary sectional view taken on line 4—4 in FIG. 3.

FIG. 5 is a fragmentary sectional view taken on line 5—5 in FIG. 1.

FIG. 6 is a fragmentary top plan view of another arrangement embodying my invention.

FIG. 7 is a fragmentary sectional view taken on line 7—7 in FIG. 6.

DESCRIPTION OF A PREFERRED EMBODIMENT OF THE INVENTION

FIG. 1 is top plan view of a support mechanism 10 for the main stem area of a plant growing in a cylindrical container 12 (shown in dashed lines). Mechanism 10 comprises a ring structure 14 defined by two horizontal bars 16 extending parallel to each other, and two other bars 17 extending parallel to each other crosswise of the first two bars. Bars 17 overlie bars 16 so that end areas of bars 17 overlap local areas of bars 16. A threaded connector means 19 (nut and bolt assembly) extends through each of the four overlapped bar areas to securely fasten the bars together.

Ring structure 14 circumscribes a rectangular space 20 that receives the main stem (or stems) of the plant growing in container 12. In actual practice container 12 is often two containers, one within another. The inner (smaller) container is a fiber or ceramic container filled with earth to grow the plant. The outer container may be of an ornamental character to enhance tee plant appearance; it can be formed of colored plastic, woven wicker, etc. The outer container is usually somewhat deeper than the inner container so that the rim of the outer container is located above the rim of the inner container.

I contemplate that my improved plant stem support mechanism 10 will be clamped to the rim area of the ornamental container (which is the outer container in a two-container arrangement). In the arrangement of FIGS. 1 through 5 the clamping mechanism comprises two cross tie elements 22 underlying bars 16 outboard from bars 17, i.e. further away from the container axis.

Tie elements 22 are rigidly (but adjustably) connected to bars 16 by threaded connectors 19 (similar to the previously mentioned connectors). Each threaded connector 19 comprises a square (non-circular) head section 23 and a threaded shank section 24. Each head section 23 is slidably disposed within a trackway 25 formed in the undersurface of the associated tie element 22. A similar trackway is formed in the undersurface of each bar 16. The upper end of each threaded connector 19 receives a wing nut 27 to firmly attach tie element 22 to bar 16. A similar arrangement is used to attach each bar 16 to the overlying bar 17.

FIG. 5 shows one way that tie element 22 can be connected to the rim area of container 12. An L-shaped member 29 is slidably mounted in trackway 25 for adjustment toward or away from the outer face of the container rim. The end of tie element 22 engages the inner face of the container rim. Member 29 is held in a desired position of adjustment by means of a set screw 31 that extends through a slot 32 in member 29 into a threaded hole in member 29. Slidable adjustment of member 29 compensates for thickness variations in the container 12 wall.

It will be seen from FIG. 1 that each of the six major components (16, 16, 17, 17, 22, 22) has a number of slots 32 therethrough. Each threaded connector (19 or 31) extends through one of the slots. Each threaded connector 19 is captively retained in the associated trackway so that it will not fall out of the trackway. Each connector can be manually moved along the trackway and associated slot 32. Each trackway 25 preferably includes lips 33 that protrude a few thousandths of an inch toward the track centerline to underlie edge areas of square head 23. Connectors 19 are factory-installed in trackways 25 by pressing them into position past lips 33.

INSTALLATION OF THE SUPPORT MECHANISM ON THE CONTAINER

Initially, members 22 are installed separately on the container rim by suitable adjustment of clamp elements 29. With members 22 in place the two bars 16 are separately placed on members 22; the appropriate wing nuts 27 are threaded onto connectors 19 to fasten bars 16 to members 22. Bars 16 are installed to be close against opposite side surfaces of the plant stem. Members 17 are then installed on bars 16 so that members 17 are close against other side surfaces of the plant stem. The plant stem area has four points of engagement with the defined ring structure, i.e. the two bars 16 and two bars 17.

The final locations of bars 16 and 17 ar dictated by the plant stem thickness and plant stem location relative to the container centerline. The support system can be used with plants having a single main stem or with plants having multiple main stems. Adjustments of member 22 in the arrow 37 direction (FIG. 1) adapts the mechanism to different size plant containers.

FIGS. 6 AND 7

The arrangement of FIGS. 6 and 7 is the same as the arrangement of FIGS. 1 through 5, except that cross tie elements 22 are not used. Rim clamp members 39 are mounted directly on bars 16.

Each clamp member 39 comprises a U-shaped member 41 having a threaded stud 43 extending through a slot 32 in bar 16. A set screw 44 clamps member 39 to the container rim. The clamp member is slidable along bar 16 to adapt the mechanism to different container sizes.

The illustrated plant stem support mechanisms (FIG. 1 or FIG. 6) are advantageous in the following respects:

1. Ring 14 can be enlarged or reduced to conform to varying plant stem thicknesses.
2. Ring 14 can be positioned around the plant stem whatever the stem location. The stem does not have to be on the container centerline.
3. The support mechanism is adjustable to fit a range of container sizes.
4. The support mechanism can be installed on the plant container without disturbing the plant foliage. Components 16 and 17 are moved into place from the side, not from points above the plant.
5. The support mechanism has relatively few loose parts (principally wing nuts 31).

I claim:

1. A support mechanism for the main stem area of a plant growing in a container; said mechanism comprising a ring structure adapted to encircle the plant stem area above the container rim; and means for detachably clamping the mechanism to the container rim;

said ring structure being defined by four horizontal bars arranged in a rectangular grip pattern; first and second ones of said bars being parallel to each other above the container rim, and third and fourth ones of said bars extending parallel to each other crosswise of the first and second bars so that sections of said first and second bars are in overlapping engagement with sections of the third and fourth bars; each bar having at least one elongated slot extending therealong;

a threaded connector means extending through each of the overlapped bar sections to connect the first and second bars to the third and fourth bars; each threaded connector means comprising a threaded element having a non-circular head and a threaded shank extended through the slots in the bars, and a clamping nut threaded onto the shank to releasably clamp the associated overlapped bar sections together;

the slots in the bars slidably receiving the threaded connector elements, whereby individual bars are capable of selective adjustments in directions normal to their length dimensions, to thereby permit variations in the size and location of the ring structure.

2. The support mechanism of claim 1 wherein each of said first and second bars has a trackway extending therealong in parallel communication with the associated slot; the non-circular head of each associated threaded connector element being slidably and non-rotatably retained in the associated trackway for adjustment therealong; each trackway having at least one lip extending therealong for captively retaining the associated threaded element against removal from the associated bar.

3. The support mechanism of claim 1 wherein said rim clamping means comprises two cross tie elements individually connected to said first and second bars outboard from the third and fourth bars, and a rim-engagement member (29) including means to slidably adjustably mount the rim-engagement member on each end of each cross tie element.

4. The support mechanism of claim 1 where in said rim clamping means comprises individual rim clamp elements including means to slidably adjustably mount the individual clamp elements on undersurface areas of the first and second bars.

* * * * *